(12) United States Patent
Hendricks et al.

(10) Patent No.: US 11,628,337 B2
(45) Date of Patent: Apr. 18, 2023

(54) DYNAMIC MOTION RESISTANCE MODULE

(71) Applicant: Dynamic Accession LLC, Iselin, NJ (US)

(72) Inventors: Shawn A. Hendricks, Fords, NJ (US); Christopher M. Toner, Germantown, MD (US)

(73) Assignee: Dynamic Accession LLC, Iselin, NJ (US)

( * ) Notice: Subject to any disclaimer, the term of this patent is extended or adjusted under 35 U.S.C. 154(b) by 82 days.

(21) Appl. No.: 17/485,691

(22) Filed: Sep. 27, 2021

(65) Prior Publication Data

US 2022/0008791 A1 Jan. 13, 2022

Related U.S. Application Data

(63) Continuation of application No. 17/236,327, filed on Apr. 21, 2021, now Pat. No. 11,161,012.
(Continued)

(51) Int. Cl.
*A63B 24/00* (2006.01)
*A63B 71/06* (2006.01)
(Continued)

(52) U.S. Cl.
CPC ...... *A63B 24/0087* (2013.01); *A63B 21/0058* (2013.01); *A63B 21/153* (2013.01);
(Continued)

(58) Field of Classification Search
None
See application file for complete search history.

(56) References Cited

U.S. PATENT DOCUMENTS

| 1,066,111 A | 7/1913 | Howden |
| 6,280,361 B1 * | 8/2001 | Harvey ................. A63B 24/00 482/4 |

(Continued)

FOREIGN PATENT DOCUMENTS

| CA | 2948911 A1 | 3/2021 |
| WO | 2017106781 A1 | 6/2017 |
| WO | 2019070436 | 4/2019 |

*Primary Examiner* — Joshua Lee
(74) *Attorney, Agent, or Firm* — Danielle C. Sullivan; Carter Ledyard & Milburn LLP

(57) ABSTRACT

A modular and dynamic force apparatus for adjusting standard and dynamic torque-to-linear forces during physical activity in real-time, the apparatus including a force module, a user device and an apparatus tracking processing unit. The force module includes an open hub attachment point, wherein the open hub attaches the apparatus to an external source, one or more sensors measuring data for physical activity efficiency, an internal processor, wireless radio and force sensor module, a variable length cable, a force generating component, and motor controls. The internal processor, wireless radio and force sensor module includes an apparatus tracking measurement unit ("ATMU") adapted to measure data, a first electronic communications channel for transmitting the measured data to an apparatus tracking processing unit ("ATPU"), and a second electronic communications channel for transmitting one or more apparatus conditions data to adjust dynamic forces. The user device receives one or more apparatus conditions data over the second electronic communications channel for real-time notification and/or adjustments to the user. The user interface includes a display that provides feedback and an apparatus tracking processing unit ("ATPU"). The ATPU includes the first electronic communications channel for receiving the measured data from the ATMU, a microprocessor, a memory storage area, a database stored in the
(Continued)

memory storage area, and a tracking processing module located in the memory storage are. The database stores a first set of evaluation rules and a second set of evaluation rules, the first set of evaluation rules corresponding to one or more tracking parameters, and the second set of evaluation rules corresponding to the one or more apparatus conditions. The tracking processing includes program instructions that, when executed by the microprocessor, causes the microprocessor to determine the one or more tracking parameters using the measured data and the first set of evaluation rules, and determine the one or more apparatus conditions data using the one or more tracking parameters and the second set of evaluation rules.

9 Claims, 9 Drawing Sheets

Related U.S. Application Data

(60) Provisional application No. 63/014,191, filed on Apr. 23, 2020.

(51) Int. Cl.
*A63B 71/00* (2006.01)
*A63B 21/00* (2006.01)
*A63B 21/005* (2006.01)

(52) U.S. Cl.
CPC ...... *A63B 24/0062* (2013.01); *A63B 71/0054* (2013.01); *A63B 71/0622* (2013.01); *A63B 2024/0093* (2013.01); *A63B 2071/0072* (2013.01); *A63B 2071/0625* (2013.01); *A63B 2220/51* (2013.01); *A63B 2220/833* (2013.01); *A63B 2225/50* (2013.01)

(56) References Cited

U.S. PATENT DOCUMENTS

| | | | |
|---|---|---|---|
| 6,645,124 B1 | 11/2003 | Clem | |
| 9,586,089 B2 | 3/2017 | Lagree | |
| 9,962,576 B2 | 5/2018 | Anderson | |
| 10,143,880 B1* | 12/2018 | Boatwright | A63B 21/078 |
| 10,220,261 B1* | 3/2019 | Garsdean | A63B 24/0087 |
| 10,486,015 B2 | 11/2019 | Orady | |
| 10,589,163 B2 | 3/2020 | Orady | |
| 10,617,903 B2 | 4/2020 | Orady | |
| 10,765,914 B1* | 9/2020 | Trexler | A63B 21/00069 |
| 11,040,231 B2* | 6/2021 | Rubin | A63B 71/0622 |
| 2007/0155587 A1* | 7/2007 | Huang | A63B 23/12 482/148 |
| 2008/0119763 A1 | 5/2008 | Weiner | |
| 2009/0259728 A1 | 10/2009 | Verstegen et al. | |
| 2010/0234184 A1 | 9/2010 | Le Page | |
| 2014/0038777 A1* | 2/2014 | Bird | A63B 23/03525 482/5 |
| 2014/0194250 A1* | 7/2014 | Reich | A63B 24/0084 482/5 |
| 2018/0001181 A1 | 1/2018 | von Prellwitz et al. | |
| 2018/0214729 A1* | 8/2018 | Rubin | A63B 24/0087 |
| 2018/0361189 A1* | 12/2018 | Gupta | A63B 21/0054 |
| 2020/0047027 A1* | 2/2020 | Ward | G06F 3/017 |
| 2020/0047031 A1* | 2/2020 | Orady | A63B 24/0062 |
| 2020/0070032 A1 | 3/2020 | Orady | |
| 2020/0151595 A1 | 5/2020 | Jayalath et al. | |
| 2020/0164246 A1* | 5/2020 | Snover | A63B 21/00061 |
| 2020/0289890 A1 | 9/2020 | Kim et al. | |
| 2021/0008402 A1 | 1/2021 | Orady | |
| 2021/0003893 A1 | 2/2021 | Orady | |
| 2021/0038938 A1 | 2/2021 | Orady | |

\* cited by examiner

DYNAMIC MOTION RESISTANCE MODULE

This application is a Continuation of U.S. patent application Ser. No. 17/236,327, filed Apr. 21, 2021, entitled "DYNAMIC MOTION RESISTANCE MODULE," which claims priority to U.S. Provisional Patent Application No. 63/014,191 filed Apr. 23, 2020, entitled "DYNAMIC RESISTANCE EXERCISE MODULE" and are hereby incorporated by reference herein.

FIELD OF THE INVENTION

Embodiments described herein generally relate to a modular dynamic force module used to vary unique dynamic forces during different forms of physical activity.

BACKGROUND OF THE INVENTION

Dynamic and varying forces used during physical activity maximize efficiency and reduce injury or strain versus static weights or dedicated electro-mechanical exercise systems.

Some exercise machines utilize resistance mechanisms, such as U.S. Pat. No. 6,440,044. However, U.S. Pat. No. 6,440,044 is limited in the amount of resistance it can provide for a user. Further, the resistance mechanism is based on counterweights rather than by force created by the user. This makes the user more prone to overwork their muscles and makes the user more susceptible to injury.

U.S. Patent Publication No. 20030027696, teaches a cable machine having weight stacks attached to a cable. A pulley system is utilized which is limited in the range of motion that can be used and can cause a user to overly isolate a single muscle which could result in injury.

Resistance bands, such as U.S. Design Pat. No. 750,716, can be attached to different equipment to provide a variety of forces in varying ranges of motion, however, the resistance is limited based on the quality of the band. Furthermore, the resistance created using the bands is static throughout the physical activity.

U.S. Patent Publication. No. 20080119763 teaches a system for acquiring, processing and reporting personal exercise data on selected muscle groups by measuring vector force from at least one muscle or muscle group acting on physical exercise equipment. It provides the user with information so the user can make manual adjustments to the exercise equipment.

U.S. Patent Publication No. 20200151595 discloses processing sensor data to improve training for the user. The invention provides the user with feedback and recommendations to make form and manual resistance adjustments for subsequent modifications of training regimens.

U.S. Pat. No. 10,661,112, discloses digital strength training using information received related to the position of an actuator coupled to a cable Which is coupled to a motor.

The prior art fails to provide a modular dynamic motion resistance module that analyzes real time data to provide automatic real time adjustments to forces. The present invention improves the efficiency of the physical activity, such as exercise, is more accurate and reduces injury and strain to the user.

SUMMARY OF THE INVENTION

The present invention provides a system and method for improving the efficiency of physical activity.

The Dynamic Motion Resistance Module ("DMRM") and method of creating varying forces is an improvement to the prior art because it uses variable torque force (e.g. DC motors, Eddie currents, friction clutch or torsional sensors) that is converted to a linear force and controlled by a microprocessor, receiving adjustments based upon a variety of sensors and calculated optimized forces. This allows a user to perform physical activity, such as exercise, based on his or her unique ability creating the varying force based on the amount of force the user is able to apply. The force may vary within a single repetition or a set of exercise if the user's applied force capacity fluctuates within the activity. The DMRM is particularly helpful for users recovering from injuries and conscious of not overworking muscles.

Exemplary embodiments disclosed herein describe a module that provides for a dynamic force control, that is electromechanically controlled in a closed loop apparatus (Mechanical, Electrical, Software) that can vary the relative forces a user experiences and adapts to the individual during physical activity, such as a workout or therapy session, based on a variety of input variables. The input variables include repetition rate, recovery period, current physical activity profile, daily goals, historical guidance, and AI adjustments. The input variables may be received from an associated mobile application on a user's device, or from the force module. The DMRM is unique from other physical activity equipment, such as static Olympic weight plates, because it is a modular system that uses variable torque force to create dynamic forces for the user in real-time. Thus, the DMRM may be used as a replacement module to static weight plates.

The DMRM improves a user's physical activity through adaptation and adjustment of forces, based upon inputs from a variety of one or more sensors and calculated adjustments to optimize each physical activity and force efficiency. The sensors may include Hall Effect for position, Strain Gauge (for example, Force Sensitive Resistor, Piezo, optic, or torsional sensor) for forces, contact closures or proximity detection for safety interlocks or motor control.

The DMRM can be attached to many Olympic or standard Barbell and Dumbbell components or other exercise equipment to add dynamic forces to an otherwise static mass.

The DMRM may be mounted in unique ways. It may be profiled and used for static force routines with programmable forces and hold times, adapted to the daily physical activity or to add the same elements of closed loop force adjustments to other physical exertion applications and therapies.

A modular and dynamic force apparatus for adjusting standard and dynamic torque-to-linear forces during physical activity in real-time, the apparatus including a force module, a user device and an apparatus tracking processing unit. The force module includes an open hub attachment point, wherein the open hub attaches the apparatus to an external source, one or more sensors measuring data for physical activity efficiency, an internal processor, wireless radio and force sensor module, a variable length cable, a force generating component, and motor controls. The internal processor, wireless radio and force sensor module includes an apparatus tracking measurement unit ("ATMU") adapted to measure data, a first electronic communications channel for transmitting the measured data to an apparatus tracking processing unit ("ATPU"), and a second electronic communications channel for transmitting one or more apparatus conditions data to adjust dynamic forces. The user device receives one or more apparatus conditions data over the second electronic communications channel for real-time notification and/or adjustments to the user. The user interface includes a display that provides feedback and an apparatus tracking processing unit ("ATPU"). The ATPU includes the first electronic communications channel for receiving the measured data from the ATMU, a microprocessor, a memory storage area, a database stored in the memory storage area, and a tracking processing module located in the memory storage are. The database stores a first set of evaluation rules and a second set of evaluation rules, the first set of evaluation rules corresponding to one or more tracking parameters, and the second set of evaluation rules corresponding to the one or more apparatus conditions. The tracking processing includes program instructions that, when executed by the microprocessor, causes the microprocessor to determine the one or more tracking parameters using the measured data and the first set of evaluation rules, and determine the one or more apparatus conditions data using the one or more tracking parameters and the second set of evaluation rules.

BRIEF DESCRIPTION OF THE DRAWINGS

The various advantages of the embodiments of the present disclosure will become apparent to one skilled in the art by reading the following specification and appended claims, and by referencing the following drawings, in which:

DETAILED DESCRIPTION

The DMRM's unique modular functionality allows it to attach to various traditionally used force equipment (e.g. barbells, racks, benches) as well as use in other physical activities. The DMRM includes a full closed/feedback loop motor control of adjustment and refinements based upon the user's dynamic or profiled reaction to the force being performed, in real-time. This allows the user to utilize numerous muscle groups at once in an almost limitless number of physical activity forces and ranges of motion. The varying forces are based on applied user force and limits the likelihood of injury. Furthermore, the present invention has less mass than the traditional static weight plate equivalent, therefore, accidentally dropping the apparatus on a toe or finger, would likely cause less injury to the user. The modularity, combined with the novel means of replicating varying forces, and the lighter mass make the DMRM unlike any other force equipment.

The DMRM may be used for a variety of types of physical activity. This includes exercise, boundary constraints, safety modules and two-person interactive activities.

Figure 1:
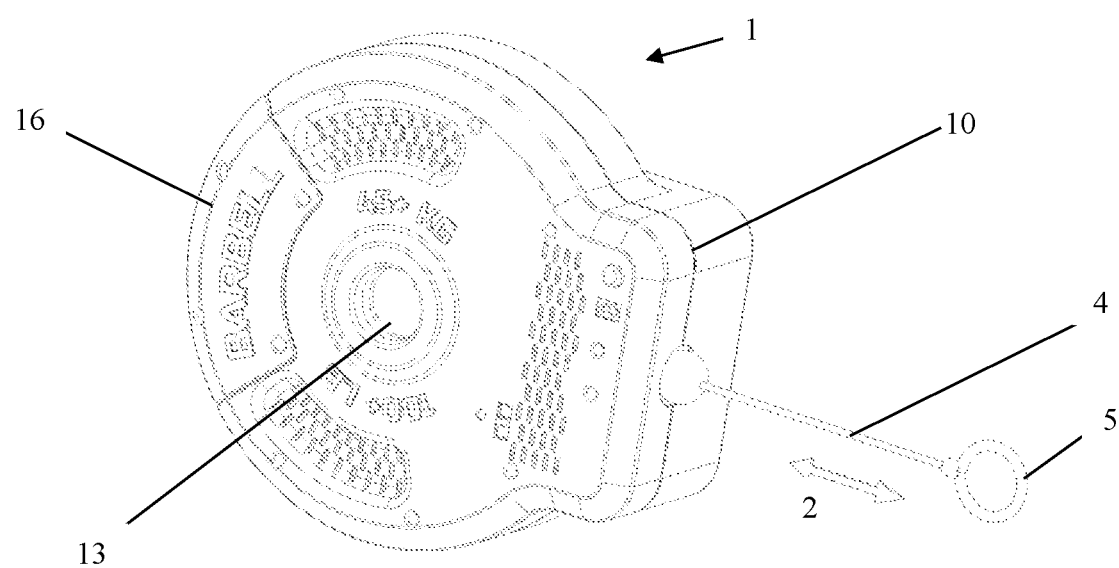
FIG. 1 shows an exemplary DMRM configured to operate according to an embodiment of the invention for use with force equipment commonly found at professional workout studios or home gyms.

FIG. 1 shows an example of a modular, standalone Dynamic Motion Resistance Module 1. Although some of the exemplary embodiments described herein are tailored to a stand-alone module, the present disclosed apparatus and methods are not limited to this configuration and can be used in other apparatus environments using similar applications and methods. One or more modules may be mounted or anchored to the equipment being used.

As illustrated in FIG. 1, the apparatus includes an open hub 13, that is sized to fit on varying types of equipment, such as Olympic or standard Barbell and Dumbbell components. The outer shell 10 houses the dynamic force components including a motor, such as a DC motor, a power source, a smart controller/wireless communication, sensors, an embedded processor and a cable or strap spool 4. The module may also include a display. Cable or strap spool 4 of the DMRM 1 provides a connection point 5 to attach hand grips, bars or fixed points for the user to use the attached module. Sensors may include torsional sensors such as Hall effect, strain gauge, safety interlocks as well as external physiological sensors such as heart rate, forces, timing, workout form, calorie burn, workout repetition speed and workout history. The sensors are located within the force module, however the exact location may vary. The sensors may be located together with the internal processor and wireless radio module or separately within the force module. The sensor feedback may be audible, tactile and/or haptic. DMRM 1 is fitted onto internal rotational part 13 providing varying forces to the strap or cable 4 in a linear direction 2, such that the user experiences a varying force based upon sensor control and calculated inputs to optimize the physical activity session. DMRM 1 also accommodates placard and branding space 16.

Figure 2:
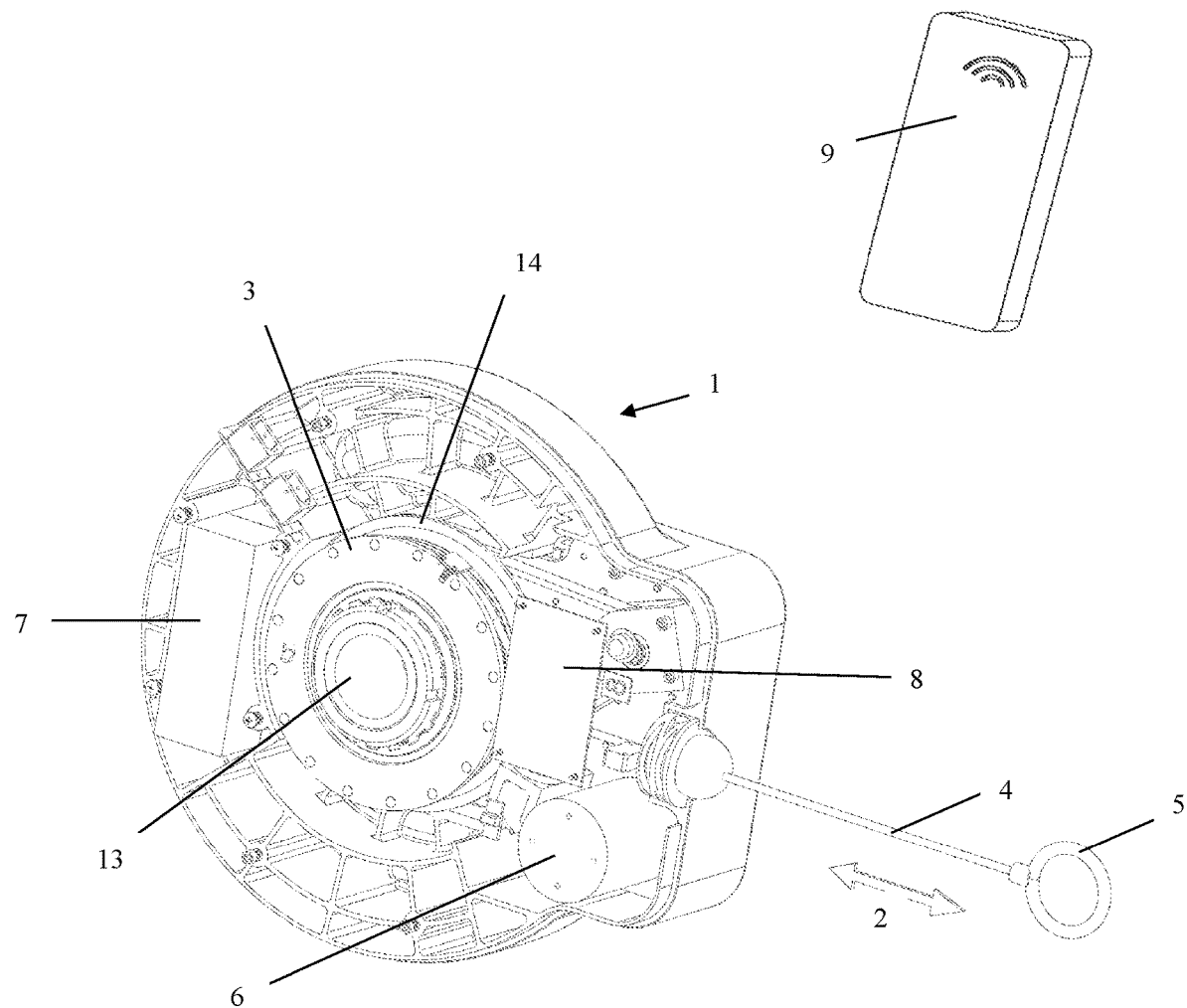
FIG. 2 shows an exemplary internal view of the DMRM.

FIG. 2 shows an exemplary illustration of the inside of DMRM 1 and internal force functionality demonstrating the major components applied in delivering the dynamic forces including the resulting linear vector of force 2, created by the internal rotational 3 force and a typical communication device 9 sending the commands for varying forces to the module. The torque-to-linear force is generated by the motor, gearing, pulleys or Eddy force component 6, powered by a supply source 7, for example, batteries or line power. The forces and communication are handled by an internal processor, wireless radio and force sensor module 8 acting both as an apparatus tracking measurement unit ("ATMU") and a self-contained integrated DMRM (offline/manual mode) alternately receiving control commands from a commercially available external device 9, acting as an apparatus tracking processing unit ("ATPU"). The ATMU measures apparatus/module data and uses an electronic communications channel to transmit the measured data to the ATPU. A second electronic communications channel is used by the ATMU to transmit one or more of the apparatus conditions data to the user interface to adjust dynamic forces. The user interface, either local on the device or an associated application, is used to adjust all forces and physical activity profiles. The ATPU includes a microprocessor and a memory storage area. The memory storage area includes a database and a tracking processor module. The tracking processing module includes program instructions that, when executed by the microprocessor, determines one or more tracking parameters using the measured data and a set of evaluation rules and the apparatus and/or module conditions measured by the ATMU, using one or more of the tracking parameters and another set of evaluation rules. The database stores the sets of evaluation rules. At least one set of rules corresponding to one or more of the personal tracking parameters, such as repetitions per minute, total repetitions, calories burned, and goals achieved, another set of evaluation rules corresponding to the one or more conditions of the apparatus and/or module.

The embedded processor of module 1 monitors the electronic motor control loop, sensor management and wireless communications, such as Bluetooth Low Energy (BLE), Wi-Fi or cell. The embedded processor provides local control and calculations and variables, such as main power, timers, motor control profile, start/stop, effective forces and safety interlock status. It can also provide the ATPU with calculated or raw data so higher-level calculations can be performed at either boundary of the architecture. The ATPU is a logical element that may be physically located within the DMRM or in the user interface. The ATPU transmits the apparatus conditions such as battery charge status, safety status and system health. The optimized linear forces are directed to cable or strap 4. Cable or strap 4 includes an attachment point 5, such as a cleat, an eye-hook or other common or custom attachment points, to allow a variety of accessories and attachment options to cable or strap 4. When the module is "Off-line" it can be in either low power sleep mode or powered off.

Figure 3A:
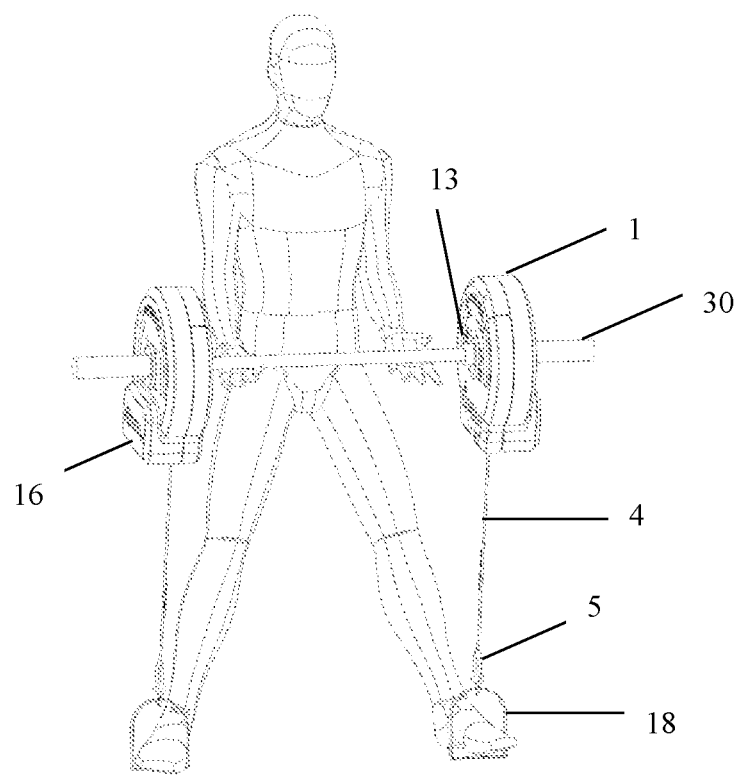
FIGS. 3a and 3b show an exemplary use with the DMRM.
Figure 3B:
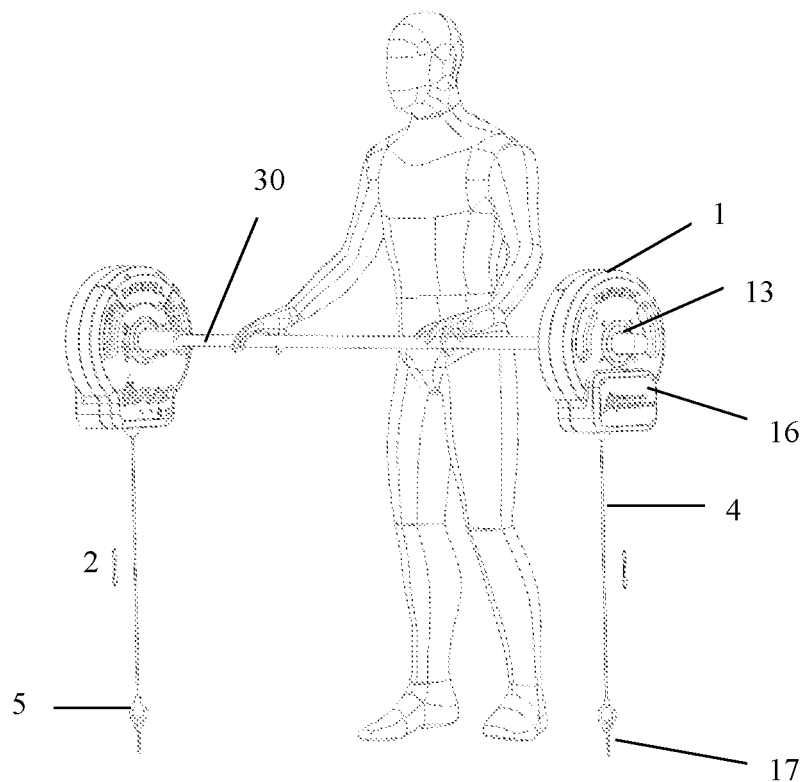

FIGS. 3a and 3b illustrate an embodiment of the DMRM 1 in practice with application of forces and internal force functionality. The resulting vector of force 2 may be accommodated by an internal Industry Standard/Common Barbell or Dumbbell rod 30 or other common hub adaptations for the module to connect/mount. Strap or cable 4 and attachment point 5 are in a linear direction, such that the user experiences a varying force based upon sensor and calculated inputs to optimize a physical activity session. DMRM 1 includes multiple safety mechanisms, such as cable safety stops (cut-off switch), anchor points (foot anchor 18 in FIG. 3a or floor anchor 17 in FIG. 3b), and/or hardware/software control loops and feedback loops (Sensor, Electronic, Software) for a real-time closed loop controlled and dynamic force application. Foot anchors 18 counteract the applied forces for a dynamic free weight experience.

Figure 4A:
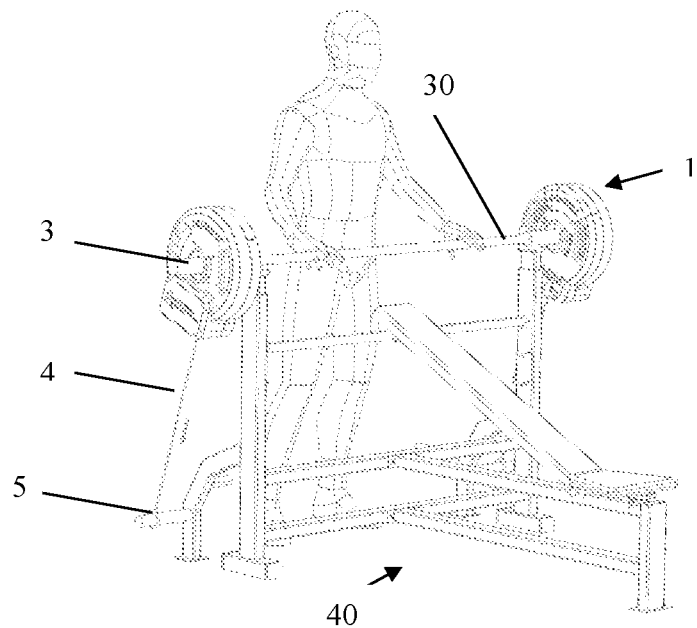
FIGS. 4a, 4b and 4c show an exemplary use of the DMRM with an exercise bench.
Figure 4B:
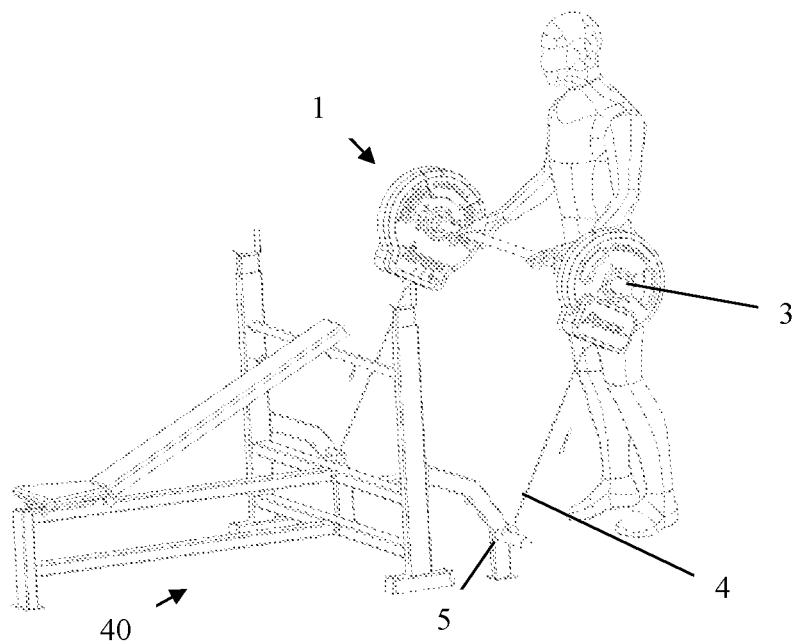
Figure 4C:
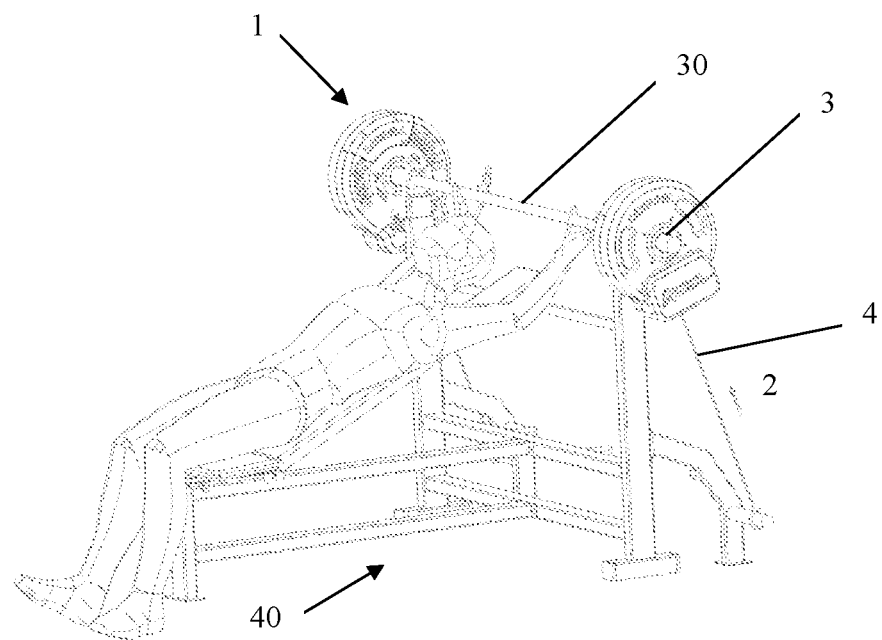
Figure 5:
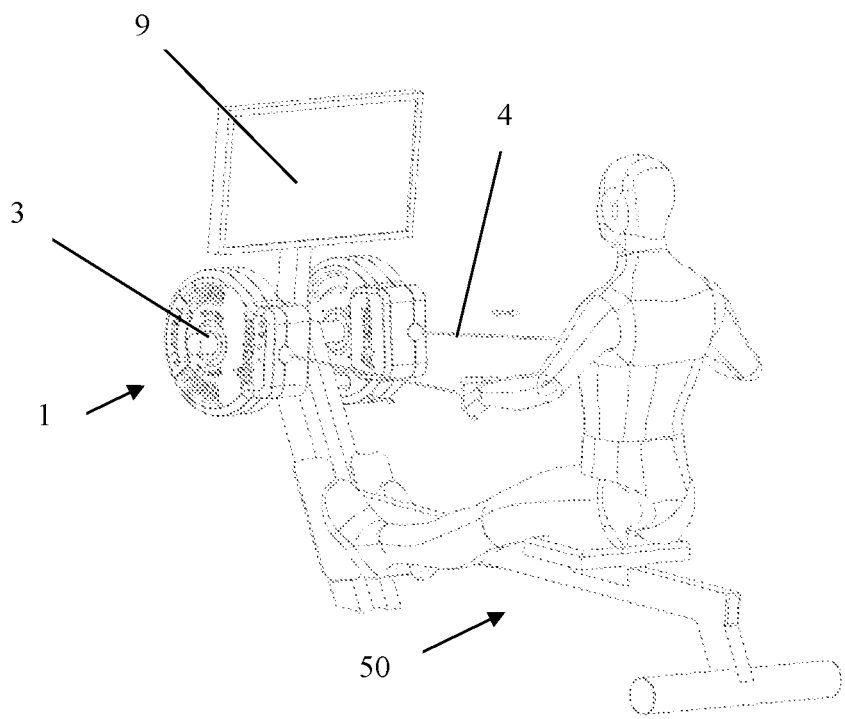
FIG. 5 shows an alternate use of the DMRM with the user pulling the variable force cable on a rowing machine.

FIGS. 4a, 4b, and 4c illustrate DMRM 1 being used with weight bench 40. DMRM 1 is mounted on bar 30. The user is able to perform a variation of exercises with different ranges of vector of force 2. FIG. 5 illustrates the use of DMRM 1 on rowing machine 50. The user interface 9 can be part of the rowing machine or can be a separate user interface such as a smartphone. Two DMRM 1 are attached to rower 50, however the number of modules attached to the equipment can be one or more. The user pulls on cables 4 while rowing on rowing machine 50 and receives real-time feedback and a haptic sensation of actually rowing in water.

Figure 6:
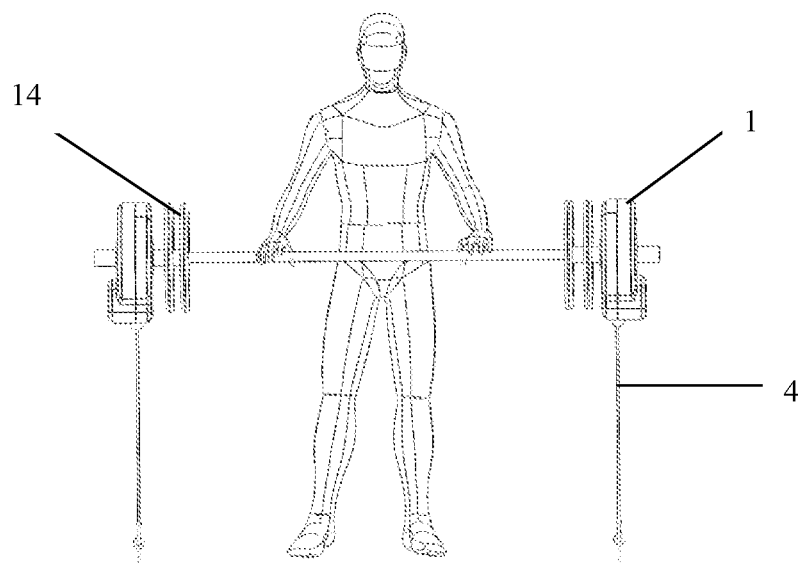
FIG. 6 shows an alternate use of the DMRM with the user pulling the variable force cable.
Figure 7:
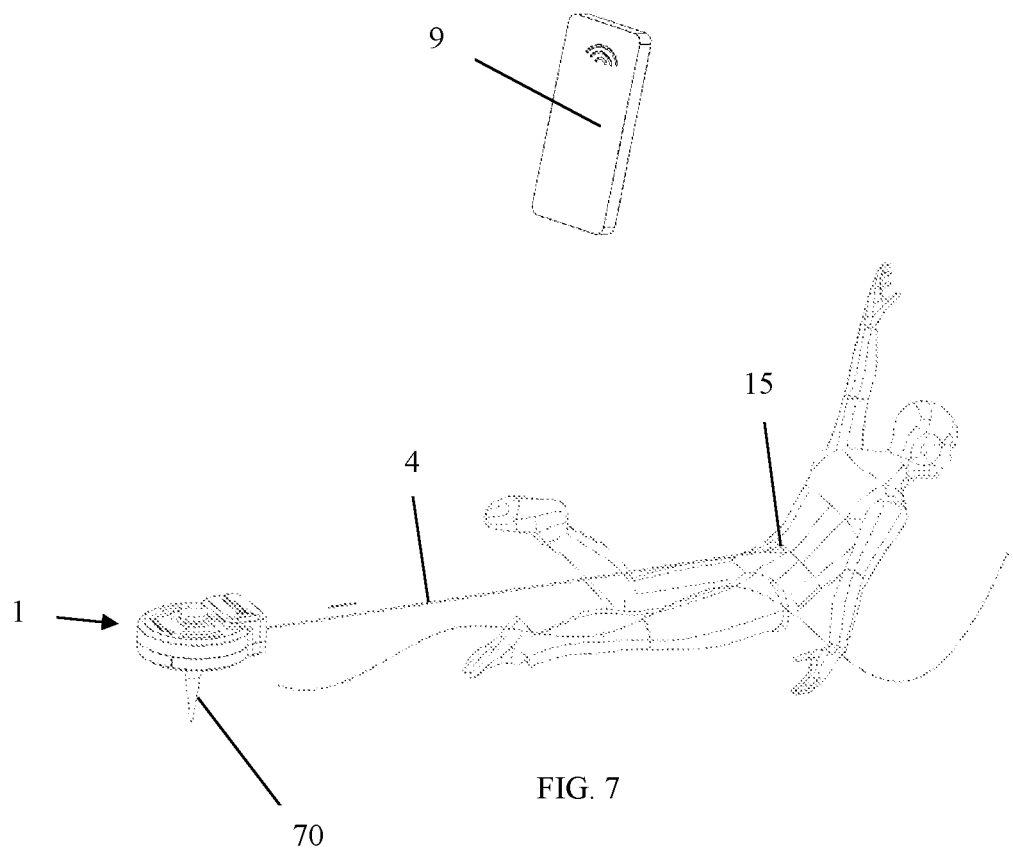
FIG. 7 shows an alternate use of the DMRM with the user pulling the variable force cable while swimming.
Figure 8:
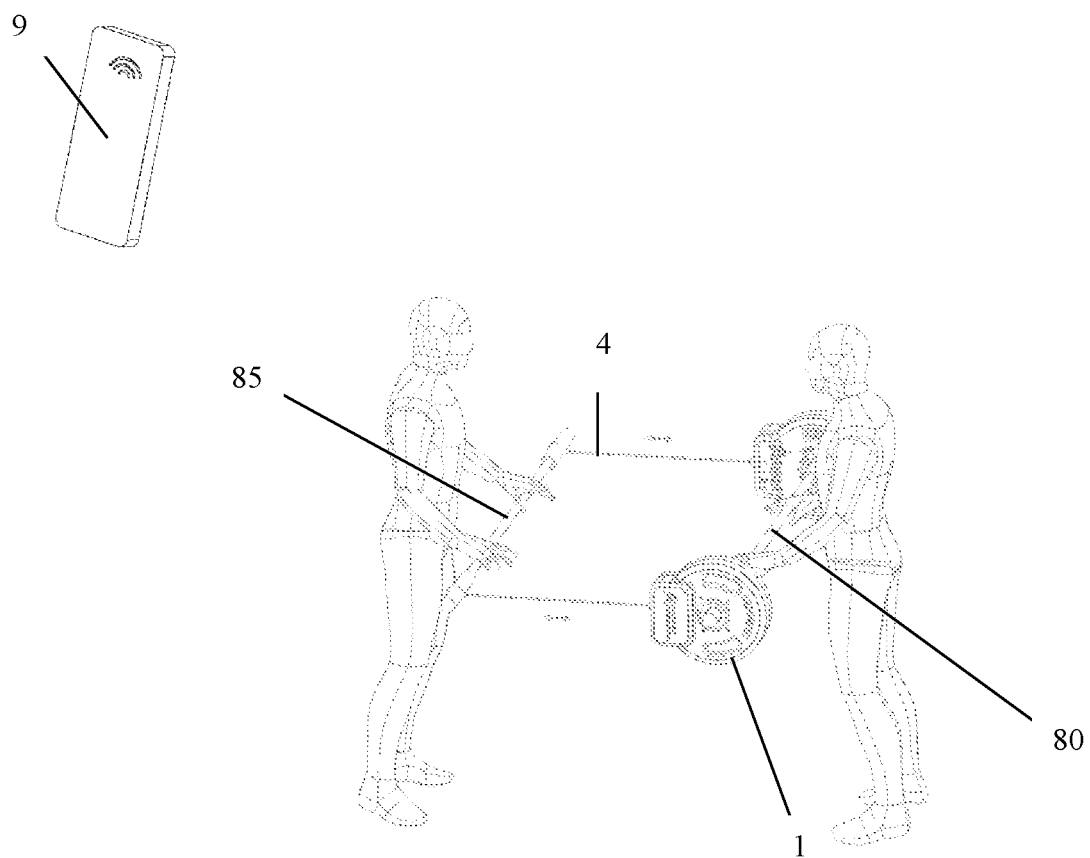
FIG. 8 shows an alternate use of the DMRM with two interactive users.
Figure 9:
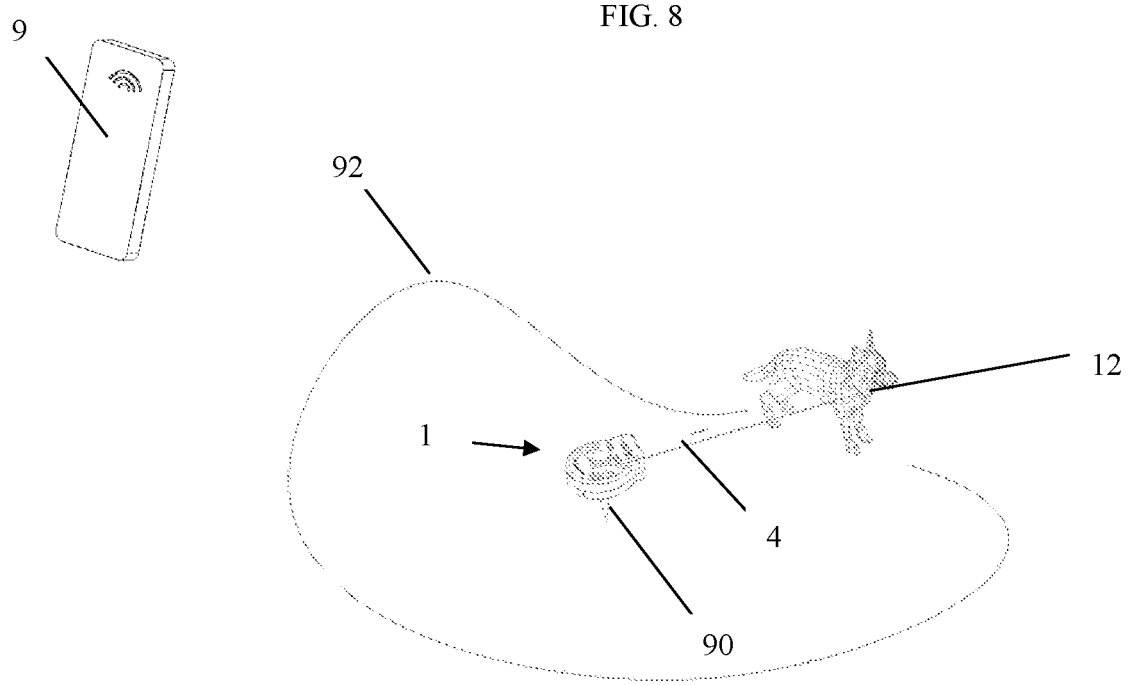
FIG. 9 shows an alternate use of the DMRM with a pet.

FIGS. 6, 7, 8 and 9 show exemplary illustrations of additional uses with DMRM 1. In addition to mounting the DMRM to traditional exercise equipment, static weight plates 14 may be added as seen in FIG. 6. DMRM 1 may be mounted in other ways, for example, DMRM 1 may be mounted to one or more anchor points 70 on a load bearing structure and then attached to a swimmer's harness 15 to adjust or measure dynamic physical activity force while swimming (FIG. 7). As seen in FIG. 8, DMRM 1 may also be used for two-person interactive exercises or therapy activities. One user holds the onto barbell 80 where two modules are mounted, for example, while the other user attaches a barbell (or other form of equipment) 85 to strap or cable 4 via attachment point 5. Another example, shown in FIG. 9, attaches DMRM 1 to an animal or pet by a harness or leash 12, for example. DMRM 1 provides freedom of movement for the animal, unless the animal reaches the user set boundary. Once the set boundary 92 is reached; dynamically applied forces begin to apply resistance leading to a full stop (a hold or lock mode, for example) at a controlled length and containment.

Figure 10:
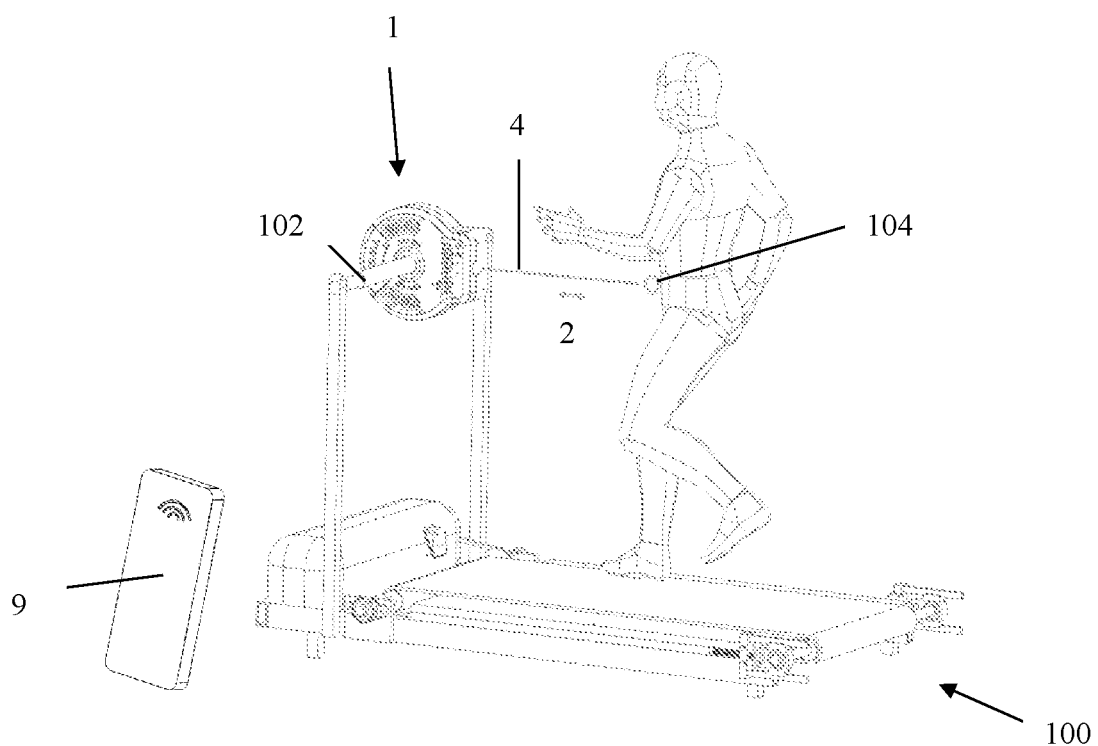
FIG. 10 shows an alternate use of the DMRM on a treadmill.
Figure 11:
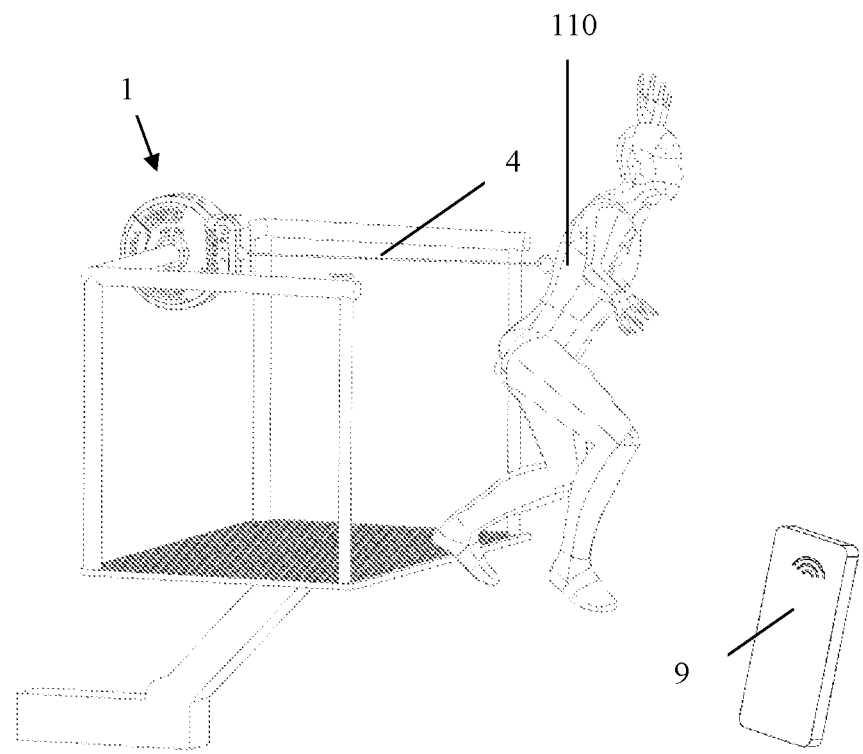
FIG. 11 shows an alternate use of the DMRM as a safety module.
Figure 12:
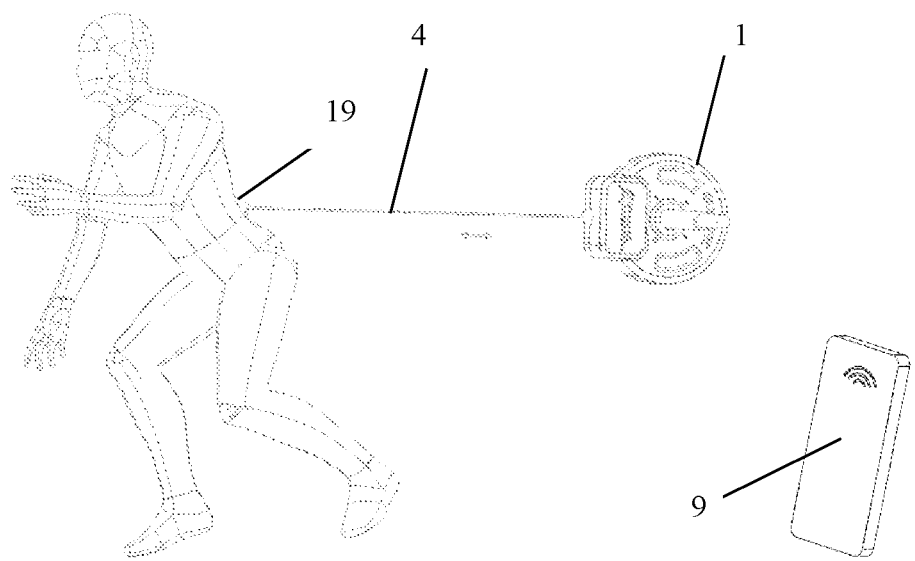
FIG. 12 shows an alternate use of the DMRM with the user pulling the variable force cable.

FIGS. 10, 11 and 12 provide additional alternate uses of DMRM 1. FIG. 10 shows attaching DMRM 1 to treadmill 100 at attachment point 102 and attaching cable or strap 4 to the user's waist by a harness or other connection point 104 keeping the runner perfectly centered on treadmill 100. DMRM 1 may also be used as a safety arresting module, such as in FIG. 11, attached to a user at connection point 110, such as a harness, providing freedom of movement to the user (human or animal). If, or when, a spurious force is detected, such as a fall or trip, the apparatus holds or locks, securing the user. FIG. 12 illustrates use by a sprinter or skater in which DMRM 1 is attached to the user by a harness or other connection point 19 during training. The apparatus senses and controls the applied forces to the user. The module can additionally be profiled and used for static force routines with programmable forces and hold times, adapted to the daily physical activity or to add the same elements of closed loop force adjustments to other physical exertion applications and therapies.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method for adjusting standard and dynamic torque-to-linear forces during physical activity in real-time, the method comprising:
    attaching to a substantially fixed substrate a modular dynamic force module that is operatively connected to equipment being used by a user during the physical activity, wherein the modular dynamic force module contains an open hub attachment, one or more sensors, an internal processor, a tracking measurement unit, a variable length cable, a force generating component and motor controls;
    collecting real-time activity data generated by the tracking measurement unit indicative of torque-to-linear forces generated by the user during the physical activity;
    transmitting the activity data to a force processing unit for analysis according to predetermined sets of evaluation rules;
    applying a first set of evaluation rules to determine at least one tracking parameter using the activity data;
    applying a second set of evaluation rules to determine at least one apparatus condition parameter using the at least one tracking parameter;
    transmitting the at least one apparatus condition parameter to a user device;
    causing the user device to provide a real-time notice of the at least one apparatus condition parameter; and
    causing the modular dynamic force module to adjust in real-time, the torque-to-linear forces experienced by the user.

2. The method as recited in claim 1, further comprising storing the first and the second set of evaluation rules in a database.

3. The method as recited in claim 1, further comprising powering the adjusted torque-to-linear forces by an internal and self-contained power source.

4. The method as recited in claim 1, further comprising providing sensor feedback to send drive and/or resistance commands for physical activity refinement.

5. The method as recited in claim 1, further comprising locking the modular dynamic force module when a spurious force is detected.

6. The method as recited in claim 1, wherein the user is at least one person engaged in physical strength training.

7. The method as recited in claim 6, wherein the adjusted torque-to-linear forces are applied to a single repetition.

8. The method as recited in claim 6, wherein the adjusted torque-to-linear forces are applied to a set of exercises when the user's applied force fluctuates within the physical activity.

9. The method as recited in claim 1, wherein the user is an animal.

* * * * *